C. W. DIETRICH.
SUSPENSION CLAMP.
APPLICATION FILED SEPT. 8, 1914.
1,134,519.
Patented Apr. 6, 1915.
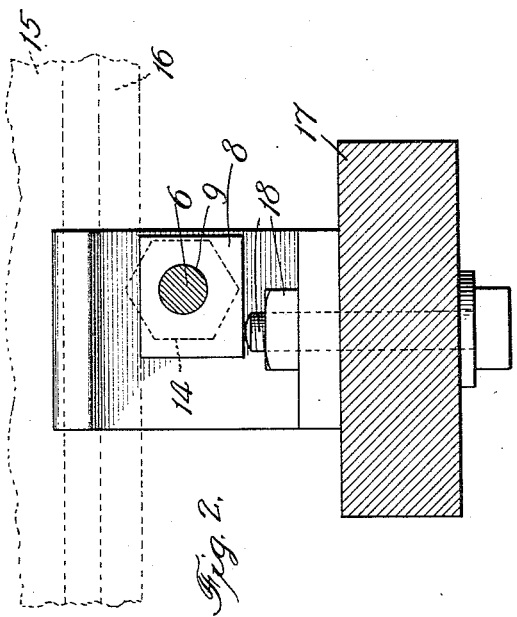
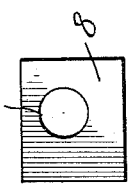
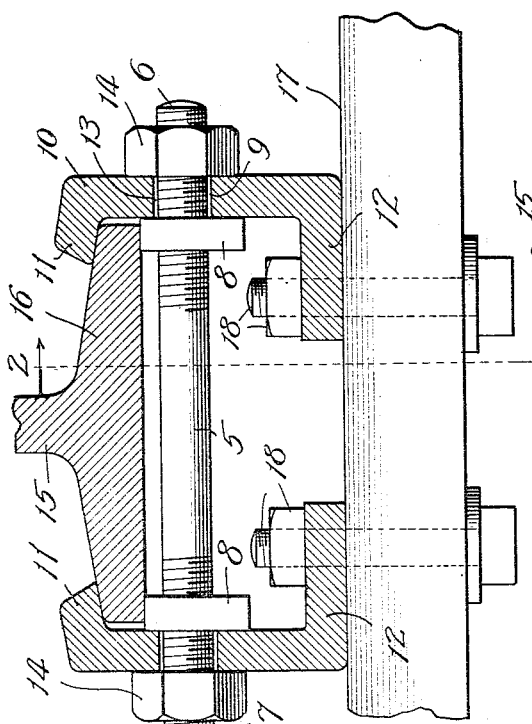
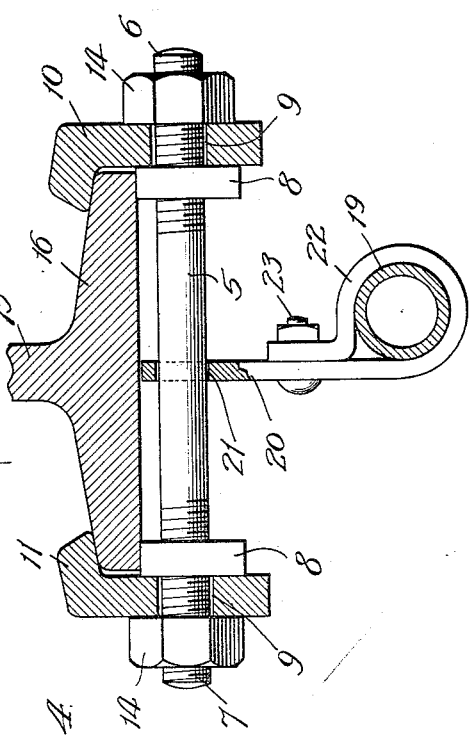
Inventor:
Charles W. Dietrich
By Dyrenforth, Lee, Chritton & Wiles
Att'ys

UNITED STATES PATENT OFFICE.

CHARLES W. DIETRICH, OF CHICAGO, ILLINOIS.

SUSPENSION-CLAMP.

1,134,519. Specification of Letters Patent. Patented Apr. 6, 1915.

Application filed September 8, 1914. Serial No. 860,769.

*To all whom it may concern:*

Be it known that I, CHARLES W. DIETRICH, a citizen of the United States, residing at Chicago, in the county of Cook and State of Illinois, have invented a new and useful Improvement in Suspension-Clamps, of which the following is a specification.

My invention relates to an improvement in clamps for suspending from overhead girders, or the like, shafting machinery, pipes and other appliances and objects, the type of clamp to which my invention relates involving means for overlapping engaging flanges on the overhead girders.

My object is to provide a clamp of such construction that it may be applied in operative position to girders of different widths and with base-flanges of different thicknesses, and which shall be of simple and economical construction and readily applied to use.

Referring to the accompanying drawings: Figure 1 is a view in sectional elevation of the preferred form of my clamping device showing it as applied to an I-beam girder, also shown in section and partly broken away, with a platform, shown partly broken away, supported from the clamp; Fig. 2 is a section taken at the line 2 on Fig. 1 and viewed in the direction of the arrow; Fig. 3 is a face view of one of the two similar adjustable devices employed as a part of the clamp for adjusting the latter to flanges of different thicknesses; and Fig. 4 is a view like Fig. 1 showing a modification of the construction illustrated in this last-referred to figure especially adapted for suspending a pipe from a girder.

My improved suspension clamp is provided more particularly for coöperation with the girders in the ceilings of buildings, whether the girders be exposed or concealed in the finished structure, though it will be readily understood that the invention is not limited to such a structure.

My improved clamp as I prefer to construct it, referring particularly to Figs. 1, 2 and 3, comprises a bolt 5 threaded at its opposite ends, as indicated at 6 and 7, and carrying blocks 8 of similar construction engaging the threads of the bolt. These blocks are preferably of rectangular form, as shown in Fig. 3, and the opening 9 in each block through which the bolt extends is so arranged that the edges of this opening adjacent the sides of the block, will be at varying distances therefrom, as represented in Fig. 3, for the purpose hereinafter explained. The bolt 6 carries members 10 beyond the blocks 8, these members 10 being each provided with an inwardly extending flange 11 at its upper end, and a similarly extending flange 12 at its lower end, the bolt 6 extending through non-threaded openings 13 in the members 10. The outer ends of the bolt 6 carry nuts 14.

The manner of using my improved clamping means is as follows: Assuming that the clamp is to be applied to a girder such as that represented at 15 in Fig. 1 and having a base-flange 16, the blocks 8 are first screwed upon the bolt 6 from opposite ends thereof, the members 10 then threaded on to the bolts to the position represented in Fig. 1 to cause the flanges 11 to overlappingly engage the flange 16 of the girder, and the nuts 14 then tightened, clamping the members 10 between the blocks 8 and the nuts, the object to be supported by the clamp, as for example, the platform represented at 17 in Fig. 1, being bolted to the flanges represented at 18. In applying the clamp as stated, the blocks 8 are adjusted along the bolt 5 to accommodate the clamp to the particular width of girder-flange, and to present to the under side of the flange 16 that side of the block which will cause the flange 16 to most closely fit in the recesses provided between the blocks 8 and the flanges 11. In the construction shown, the blocks 8 by reason of their provision of rectangular form with openings 9 disposed at a different distance from each side of the block, the clamp has four positions of adjustment. It will be understood, however, that the shape of this block may be varied as desired to produce the different adjustments desired. It will be noted from the foregoing that the blocks 8, upon tightening the nuts 14, prevent the members 12 from canting.

The construction illustrated in Fig. 4 is the same as that of the preceding figures except as modified to adapt it more particularly as a pipe-supporting clamp. In this construction the flanges 12 are omitted, and the pipe, such as that represented at 19, is supported from the bolt 5 as through the medium of a strap 20 hung at an opening 21 therein from the bolt, the lower end of the strap being bent upwardly and around the pipe, as represented at 22, and secured at its free end to the body portion of the strap, as by a bolt 23. It will be noted from the foregoing that a clamp constructed in accordance with my invention is thus rendered adjustable for flanges of girders, or the like, of different widths and thicknesses, a condition which is very desirable in practice as the provision of different sized clamps for different sizes of girders is rendered unnecessary.

While I have illustrated and described certain forms in which my invention may be embodied, I do not wish to be understood as intending to limit it thereto, as the same may be variously modified and altered without departing from the spirit of my invention.

What I claim as new and desire to secure by Letters Patent, is:

1. A clamp of the character described comprising a pair of members having projections at their upper ends for engagement with the support from which the clamp is to be suspended, a bar connecting said members together, and members on said bar located below, and spaced from, said projections, said last-named members being adjustable about said bar for varying the distance between said last-named members and said projections.

2. A clamp of the character described comprising a pair of members having projections at their upper ends for engagement with a support from which the clamp is to be suspended, a bar connecting said members together, and blocks supported on said bar below said projections and in spaced relation thereto, said blocks being adjustable about said bar and provided with a plurality of surfaces at varying distances from the center of said bar.

3. A clamp of the character described comprising a pair of members having projections at their upper ends for engagement with the support from which the clamp is to be suspended, a bar connecting said members together, and blocks having sides disposed at angles to each other, located below, and in spaced relation to, said projections, said sides being at varying distances from the center of said bar.

4. A clamp of the character described comprising a pair of members having projections at their upper ends for engagement with the support from which the clamp is to be suspended, a bar connecting said members together, and blocks threaded on said bar located below, and spaced from, said projections, the surfaces on said blocks opposing said projections being arranged at varying distances from the center of said bar.

5. A clamp of the character described comprising a pair of members having projections at their upper ends for engagement with the support from which the clamp is to be suspended, a bar connecting said members together, and blocks threaded upon said bar located below, and in spaced relation to, said projections, the surfaces on said blocks opposing said projections being arranged at an angle to each other and at varying distances from the center of said bar.

6. A clamp of the character described comprising a pair of members having projections adapted to engage the support from which the clamp is to be supported, a bar threaded at its opposite ends and extending through openings in said members, blocks threaded upon the ends of said bar and lying at the inner sides of said members, said blocks being located below, and in spaced relation to, said projections, with the sides of said blocks disposed at an angle to each other and at varying distances from the center of said bar, and nuts threaded upon the outer ends of said bar and engaging the outer sides of said members.

CHARLES W. DIETRICH.

In presence of—
H. H. BARBER,
C. L. BOOTH.